(12) United States Patent
Suzuki et al.

(10) Patent No.: US 7,832,306 B2
(45) Date of Patent: Nov. 16, 2010

(54) AUTOMATIC TRANSMISSION

(75) Inventors: Fuminori Suzuki, Okazaki (JP); Hitoshi Tanaka, Nagoya (JP)

(73) Assignee: Denso Corporation, Kariya (JP)

( * ) Notice: Subject to any disclaimer, the term of this patent is extended or adjusted under 35 U.S.C. 154(b) by 1155 days.

(21) Appl. No.: 11/227,091

(22) Filed: Sep. 16, 2005

(65) Prior Publication Data

US 2006/0075848 A1     Apr. 13, 2006

(30) Foreign Application Priority Data

Sep. 29, 2004   (JP) .............................. 2004-284367

(51) Int. Cl.
*F16H 57/02*    (2006.01)

(52) U.S. Cl. .................... 74/606 R; 439/34; 361/707; 318/551

(58) Field of Classification Search ............... 74/606 R; 475/76, 123, 127; 439/34; 361/707; 318/551
See application file for complete search history.

(56) References Cited

U.S. PATENT DOCUMENTS

| | | | | |
|---|---|---|---|---|
| 4,805,490 A | * | 2/1989 | Fuehrer et al. | ............ 74/606 R |
| 5,352,853 A | | 10/1994 | Takagi | |
| 5,361,650 A | * | 11/1994 | Klecker et al. | ............ 74/606 R |
| 5,709,134 A | * | 1/1998 | Ulm | ........................ 74/606 R |
| 5,749,060 A | * | 5/1998 | Graf et al. | .................... 340/439 |
| 5,811,747 A | | 9/1998 | Taniguchi et al. | |
| 5,823,070 A | | 10/1998 | Taniguchi et al. | |
| 6,057,519 A | | 5/2000 | Taniguchi et al. | |
| 6,164,160 A | * | 12/2000 | Nassar | ..................... 74/606 R |
| 6,205,887 B1 | | 3/2001 | Barnreiter et al. | |
| 6,393,943 B1 | * | 5/2002 | Sommer et al. | ........... 74/606 R |
| 6,530,856 B1 | * | 3/2003 | Kakiage | ..................... 475/123 |

(Continued)

FOREIGN PATENT DOCUMENTS

JP          2-3744          1/1990

(Continued)

OTHER PUBLICATIONS

Japanese Office Action dated Aug. 3, 2009, issued in corresponding Japanese Application No. 2004-284367, with English translation.

(Continued)

*Primary Examiner*—Richard W Ridley
*Assistant Examiner*—Thomas Diaz
(74) *Attorney, Agent, or Firm*—Nixon & Vanderhye PC (57) ABSTRACT

A housing is constructed of a transmission case and an oil pan and has a space therein. A through hole passes through the transmission case. A pressure control unit is housed in the housing and controls hydraulic pressure supplied to a transmission mechanism by the operation of a solenoid valve. An internal cable is housed in the housing and is electrically connected to the solenoid valve of the pressure control unit. An external cable is electrically connected to an engine control unit outside the housing. A connector is arranged in such a way as to pass through the through hole and is electrically connected to the internal cable and the external cable. The connector has an external exposed portion, which is exposed outside the housing, formed in such a way as to be able to pass through the through hole.

13 Claims, 8 Drawing Sheets

U.S. PATENT DOCUMENTS

| | | | |
|---|---|---|---|
| 6,612,202 B2 * | 9/2003 | Thorum et al. | 74/606 R |
| 6,679,137 B1 | 1/2004 | Bek | |
| 7,375,966 B2 * | 5/2008 | Murakami et al. | 361/707 |
| 2002/0088304 A1 * | 7/2002 | Thorum et al. | 74/606 R |
| 2003/0167877 A1 | 9/2003 | Yamane et al. | |

FOREIGN PATENT DOCUMENTS

| | | |
|---|---|---|
| JP | 5-30609 | 2/1993 |
| JP | 5030609 U | 4/1993 |
| JP | 8-295147 | 11/1996 |
| JP | 9-30274 | 2/1997 |
| JP | 9-53706 | 2/1997 |
| JP | 9-99749 | 4/1997 |
| JP | 11-141664 | 5/1999 |
| JP | 2001-116127 | 4/2001 |

OTHER PUBLICATIONS

Japanese Office Action dated Jan. 20, 2010, issued in corresponding Japanese Application No. 2004-284367, with English translation.

Japanese Office Action dated May 21, 2010, issued in corresponding Japanese Application No. 2004-284367, with English translation.

* cited by examiner

AUTOMATIC TRANSMISSION

CROSS-REFERENCE TO RELATED APPLICATION

This application is based on Japanese Patent Application No. 2004-284367 filed on Sep. 29, 2004, the disclosure of which is incorporated herein by reference.

FIELD OF THE INVENTION

The present invention relates to an automatic transmission.

BACKGROUND OF THE INVENTION

Conventionally, in an automatic transmission of the type in which a transmission mechanism for varying speeds stepwise or continuously variably is driven by hydraulic pressure, the hydraulic pressure supplied to the transmission mechanism is controlled by a pressure control unit controlled by a control circuit unit.

An automatic transmission such that a connector case is arranged in such a way as to pass through a housing for housing a pressure control unit and that a control circuit unit connected to the electric components of the pressure control unit is housed in the connector case to thereby form a connector is disclosed as one of the automatic transmissions of this type in U.S. Pat. No. 5,823,070. In the automatic transmission of this type, it is possible to realize, for example, a speed change responsive to the driving state of a vehicle by electrically connecting the control circuit unit housed in the connector case to another control circuit unit outside the housing and the electric components such as a sensor.

However, as disclosed in U.S. Pat. No. 5,823,070, when the connector case is divided into two parts and the divided parts are arranged respectively inside and outside the housing, it is necessary to electrically connect the electric components of the pressure control unit to the control circuit unit before the connector is formed and to perform the operation test of the automatic transmission in this state. For this reason, to form the connector after the operation test, it is necessary to clear the state where the electric components of the pressure control unit are electrically connected to the control circuit unit. Therefore, electric characteristics between the electric components of the pressure control unit and the control circuit unit that are obtained after the connector is formed will vary from those obtained when the operation test is performed, which will bring about a situation in which desired speed change characteristics cannot be produced.

SUMMARY OF THE INVENTION

The object of the present invention is to provide an automatic transmission that exerts desired speed change characteristics.

According to the present invention, a housing is constructed of a plurality of divided parts and a connector having a control circuit unit is arranged in such a way as to pass through a through hole formed in any one of the divided parts (hereinafter referred to as "a specified divided part") of the housing. After the operation test is carried out in a state where the housing is divided and where the electric components of a pressure control unit and the control circuit unit of the connector are electrically connected to an internal cable, it is possible to pass the connector having the control circuit unit through the through hole formed in the specified divided part from the side of the external exposed portion as the state of electric connection is held. Moreover, when the connector is made to pass through the through hole, it is possible to move the connector while keeping the state of electric connection by bending the internal cable or the like. Furthermore, after the connector is made to pass through the through hole, it is possible to combine the specified divided part with the other divided part as the state of electric connection is held to thereby form a housing that houses the pressure control unit and the internal cable. In this manner, it is not necessary to clear the state of electric connection after the operation test of the automatic transmission is performed, so that electric characteristics between the electric components of the pressure control unit and the control circuit unit can be held. Therefore, a finally fabricated automatic transmission can exert desired speed change characteristics.

BRIEF DESCRIPTION OF THE DRAWINGS

Other objects, features and advantages of the present invention will become more apparent from the following detailed description made with reference to the accompanying drawings, in which like parts are designated by like reference number and in which.

DETAILED DESCRIPTION OF THE PREFERRED EMBODIMENTS

Hereinafter, a plurality of preferred embodiments of the invention will be described on the basis of the drawings.

First Embodiment

Figure 2A:
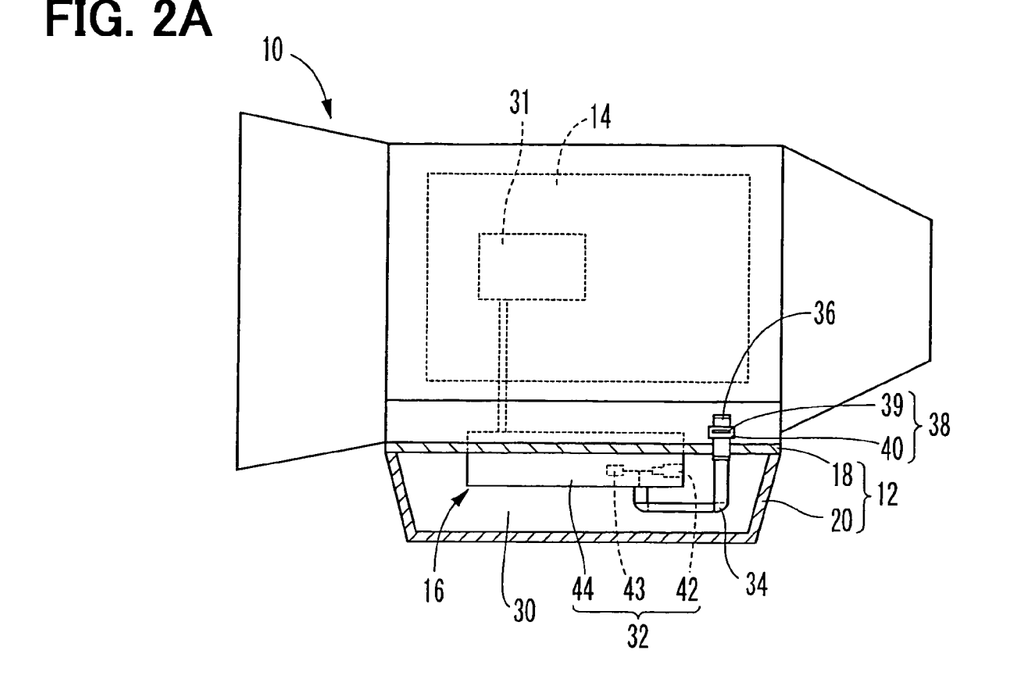
FIG. 2A is a front view, partly in cross section, showing the automatic transmission in accordance with the first embodiment
Figure 2B:
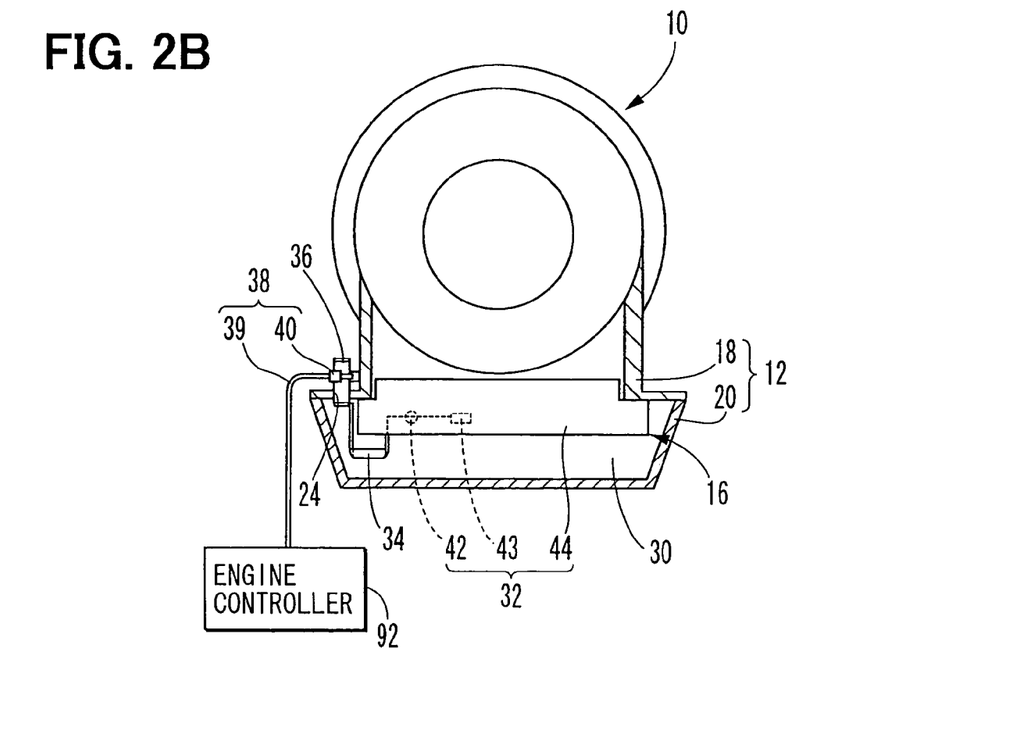
FIG. 2B is a side view, partly in cross section, showing the automatic transmission in accordance with the first embodiment.

FIGS. 2A and 2B show an automatic transmission 10 in accordance with the first embodiment of the present invention. The automatic transmission 10 is a so-called electronically controlled automatic transmission provided with a housing 12, a transmission mechanism 14, and a hydraulic pressure control module 16 and is mounted for use on a vehicle.

The housing 12 is constructed of a combination of a transmission case 18 and an oil pan 20.

Figure 3:
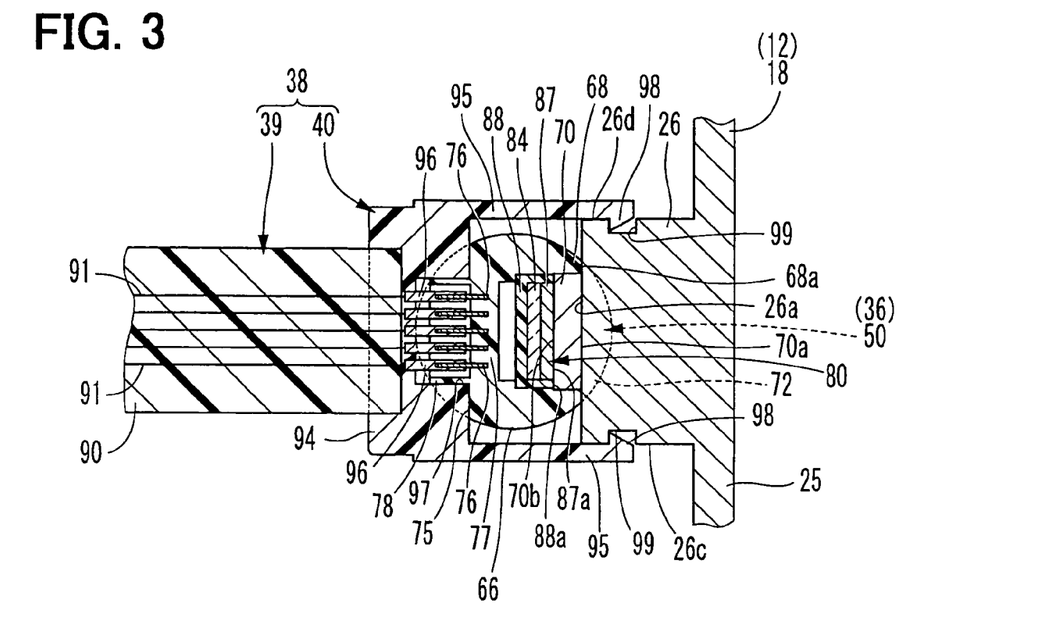
FIG. 3 is a sectional view taken on a line III-III in FIG. 1.

The transmission case 18 is formed of metal such as Aluminum in a hollow shape and houses a transmission mechanism 14 therein. As shown in FIGS. 2A, 2B, and FIG. 3, a flange portion 22 for mounting the oil pan 20 is formed at the bottom end of the transmission case 18. A through hole 24 passing through the flange portion 22 in the direction of thickness (that is, here, in the up and down direction) is formed in a cylindrical shape in the transmission case 18. A side wall portion 25 provided on the periphery of the through hole 24 in the transmission case 18 is nearly vertical to the flange portion 22 and a heat radiating portion 26 is formed integrally with the side wall portion 25. This heat radiating portion 26 is formed in the shape of a solid rectangular block protruding in a direction nearly orthogonal to the axis O of the through hole 24 from the external wall surface 25a of the side wall portion 25 and has a protruding end surface 26a formed in the shape of a flat surface. The heat radiating portion 26 receives heat from a main connector 36, which abuts against the protruding end surface 26a and will be described later, and dissipates the heat to the atmosphere outside the transmission case 18 (housing 12).

The oil pan 20 is formed of metal in the shape of a plate and is mounted on the flange portion 22 with its opening faced upward. A top end on the periphery of the opening of the oil pan 20 is in close contact with the whole of the flange portion 22 in the peripheral direction. With this, a space 30 that is surrounded by the oil pan 20 and the flange portion 22 and stores working oil is formed as the internal space of the housing 12, and the bottom end of the through hole 24 communicates with the space 30.

The transmission mechanism 14 operates a specified number of moving elements 31 according to hydraulic pressure supplied from the hydraulic pressure control module 16 to vary the transmission gear ratio of a vehicle. This transmission mechanism 14 may vary the transmission gear ratio stepwise or may vary the transmission gear ratio continuously variably. The transmission mechanism 14 that varies the transmission gear ratio stepwise refers to a transmission mechanism in which friction elements as the moving elements 31 are engaged with or disengaged from each other according to the pressure of the supplied oil. On the other hand, the transmission mechanism 14 that varies the transmission gear ratio continuously variably refers to a transmission mechanism in which the diameter of a belt wound around a pulley as the moving element 31 is varied according to the pressure of the supplied oil or a transmission mechanism in which a trunnion for supporting a power roller sandwiched between input and output discs is provided as the moving element 31 and in which the angle of inclination of the power roller is varied according to the pressure of the supplied oil.

The hydraulic pressure control module 16 controls the hydraulic pressure supplied to the moving elements 31 which drive the transmission mechanism 14. The hydraulic pressure control module 16 is constructed of a pressure control unit 32, an internal cable 34, a main connector 36, an external cable 38, and the like.

The pressure control unit 32 is fixed to the bottom surface of the flange portion 22 and is housed in the oil pan 20, that is, in the internal space 30 of the housing 12. The pressure control unit 32 has a specified number of solenoid valves 42 and a pressure sensor 43, and a body 44 that houses these solenoid valves 42, the pressure sensor 43, and the like and forms an oil passage. Working oil sucked from the oil pan 20 by an oil pump (not shown) is supplied to the oil passage formed by the body 44. The solenoid valve 42 directly controls, by the use of this working oil, the hydraulic pressure supplied to a corresponding moving element 31 or provides a pressure control valve (not shown) with a command pressure to indirectly control the hydraulic pressure supplied to the corresponding moving element 31, to thereby drive the transmission mechanism 14. At this time, the solenoid valve 42 controls the hydraulic pressure supplied to the moving element 31 according to a command signal which will be described later. Moreover, at this time, the pressure sensor 43 detects the hydraulic pressure supplied to the corresponding moving element 31 and outputs a pressure sensing signal expressing the detection result.

The internal cable 34 is a flexible cable made of a signal wire 47 wrapped by a base material 46 formed of resin in the shape of a belt. The width of the internal cable 34 is made not larger than the inside diameter of the through hole 24. The one end of the internal cable 34 is fixed to the body 44 of the pressure control unit 32 and the signal wire 47 of the internal cable 34 is electrically connected to the solenoid valves 42 and the pressure sensor 43 in the body 44.

Figure 1:
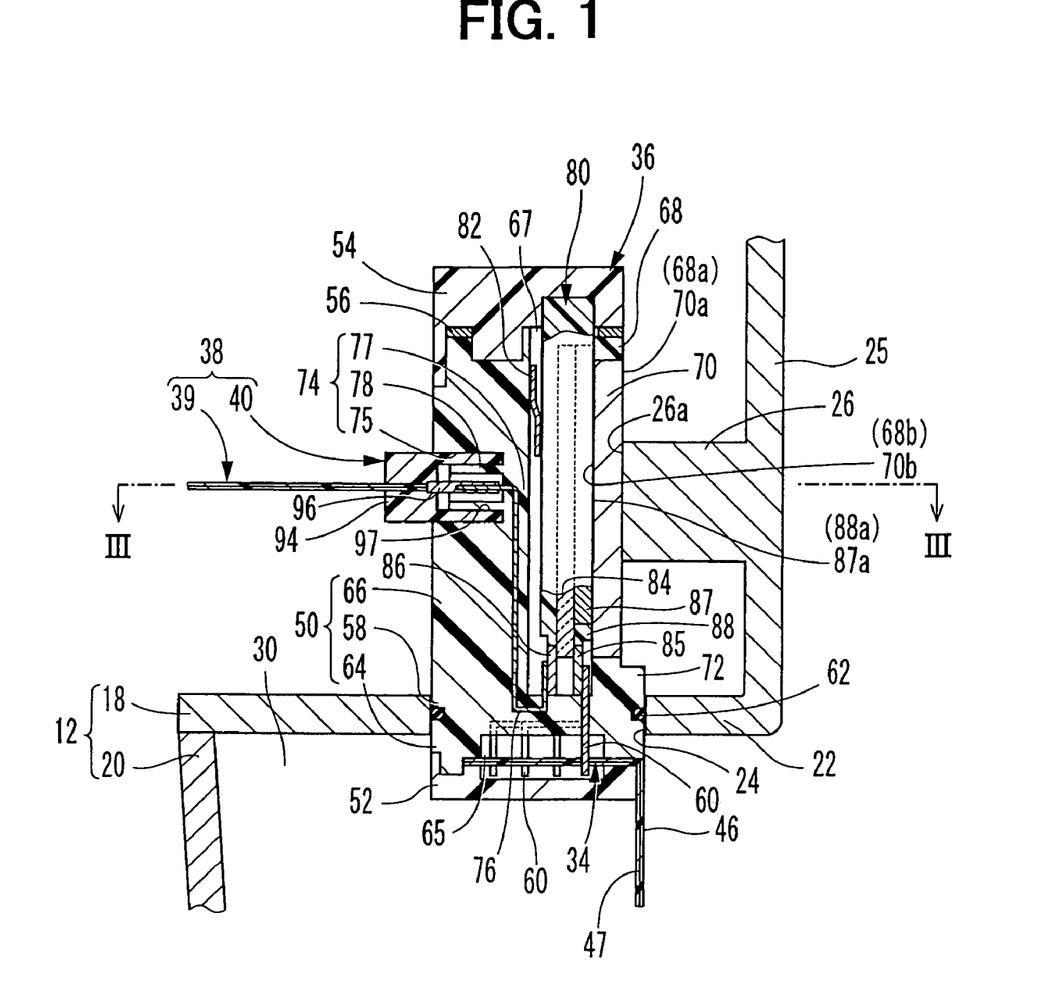
FIG. 1 is a sectional view showing the main portion of an automatic transmission in accordance with a first embodiment.

As shown in FIG. 1 and FIG. 3, the main connector 36 has a connector body 50, an internal cap 52, and an external cap 54, and a gasket 56. The maximum diameter of these elements 50, 52, 54, and 56 is made not larger than the inside diameter of the through hole 24 and the whole main connector 36 can pass through the through hole 24.

The connector body 50 is formed of resin in a hollow shape and is arranged near the side wall portion 25 in such a way as to pass through the through hole 24.

Internal connection terminals 60 are embedded in a cylindrical housing portion 58 housed in the through hole 24 in the connector body 50. The housing portion 58 is fitted in the through hole 24 via an O-ring 62, whereby the interface between the housing portion 58 and the through hole 24 is sealed.

In the connector body 50, a portion 64 adjacent to the housing portion 58 and protruding further into the housing 12 than the through hole 24 forms an internal exposed portion exposed to the internal space 30 of the housing 12. This internal exposed portion 64 is formed in the shape of a cylinder which is closed at one end and whose opening 65 faces down, and the internal connection terminals 60 are protruded into the internal exposed portion 64 from the bottom thereof. The internal cap 52 made of resin and closing the opening 65 is fitted on the bottom end of the internal exposed portion 64. These internal exposed portion 64 and internal cap 52 sandwich an end portion opposite to the pressure control unit 32 of the internal cable 34. With this, the internal cap 52 is exposed to the internal space 30 of the housing 12 and removably holds the internal cable 34 between itself and the internal exposed portion 64, and the signal wire 47 of the internal cable 34 is connected to the internal connection terminals 60. The internal cable 34 of the present embodiment has flexibility and the width not larger than the inside diameter of the through hole 24, as described above, and hence can pass through the through hole 24 in a state where it is sandwiched between the internal exposed portion 64 and the internal cap 52.

In the connector body 50, a portion 66 that is adjacent to the housing portion 58 and protrudes further outside the housing than the through hole 24 forms an external exposed portion exposed outside the housing 12. This external exposed portion 66 is formed in the shape of a cylinder which is closed at one end and whose opening 67 faces upward, and the internal connection terminals 60 are protruded into the external exposed portion 66 from the bottom thereof. The external cap 54 made of resin and closing the opening 67 is fitted on the top end of the external exposed portion 66, and the gasket 56 is sandwiched between these external exposed portion 66 and external cap 54. This prevents the gasket 56 from being exposed outside the housing 12 and hence liquid such as moisture from entering from the opening 67 into the external exposed portion 66.

An abutting portion 68 abutting against the heat radiating portion 26 in the external exposed portion 66 is formed in the shape of a flat plate extending a specified length from the top end surface of the external exposed portion 66 to the through hole 24 and is formed in the shape depressed further inward in the radial direction than the other portion. In this abutting portion 68 is embedded a heat conducting part 70 formed of metal such as Al in the shape of a flat plate. Here, the external wall surface 68a of the abutting portion 68 including the external wall surface 70a of the heat conducting part 70 is formed in a nearly flush flat surface, and the protruding end surface of the heat radiating portion 26 is in surface contact with the external wall surface 68a in such a way as to conduct heat. Moreover, the external wall surface 68b of the abutting portion 68 including the internal wall surface 70b of the heat conducting part 70 is formed in a nearly flush flat surface.

Figure 4:
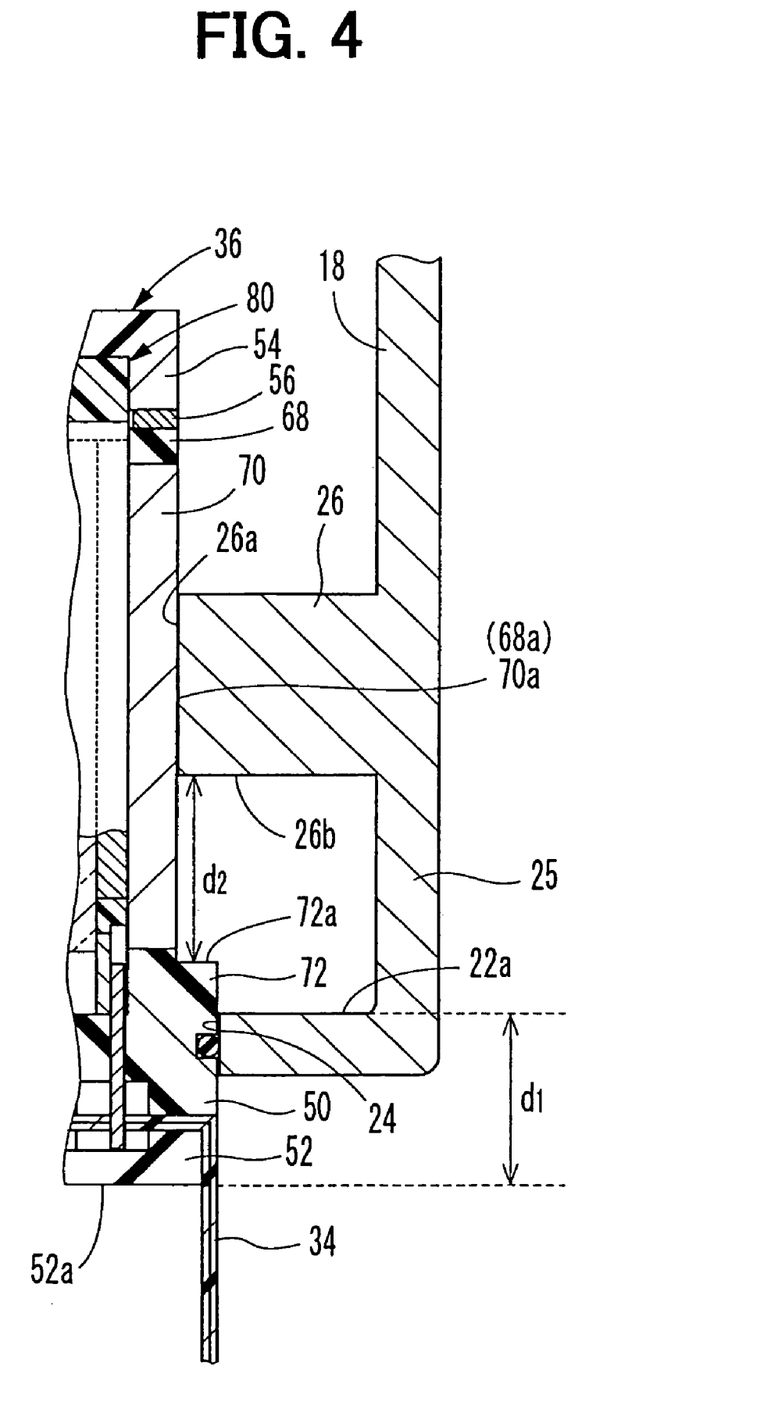
FIG. 4 is a partial enlarged view in FIG. 1.

A portion 72 that is adjacent to the through hole 24 side of the abutting portion 68 in the external exposed portion 66 forms a projecting portion that projects further to the side wall portion 25 than the abutting portion 68. As shown in FIG. 4, a top end surface 72a continuous with the external wall surface 68a of the abutting portion 68 in this projecting portion 72 is located a distance d2, which is longer than a distance d1, away from the bottom surface 26b of the heat radiating portion 26. Here, the distance d1 is a distance between the bottom end surface 52a of the internal cap 52 and the external wall surface 22a of the flange portion 22 on the periphery of the through hole 24.

As shown in FIG. 1 and FIG. 3, a mounting portion 74 having the external cable 38 mounted thereon in the external exposed portion 66 is opposed to the abutting portion 68 and the projecting portion 72 in the radial direction. In this mounting portion 74 are formed a depressed portion 75 that is open in an outer peripheral surface and is depressed inward in the radial direction, an embedding portion 77 which is formed on the bottom side of the depressed portion 75 and in which the external connection terminals 76 are embedded, and a cylindrical portion 78 which protrudes into the depressed portion 75 and into which the external connection terminals 76 are protruded. The external connection terminals 76 in the present embodiment are embedded also in the housing portion 58 adjacent to the through hole 24 side of the embedded portion 77 and protrudes from the bottom side of the external exposed portion 66 into the external exposed portion 66.

As shown in FIG. 1, the main connector 36 further has a control circuit unit 80 and an urging part 82.

The control circuit unit 80 is housed in the external exposed portion 66 and is covered with the external exposed portion 66 and the external cap 54. This control circuit unit 80 is a chip type so-called electronic control unit in which a circuit board 84 having a plurality of circuit devices mounted thereon is sealed with resin. In the control circuit unit 80 of the present embodiment, internal input/output terminals 85, external input/output terminals 86, and a heat radiating plate 87, which are made of metal, are embedded in a resin part 88 covering the circuit board 84. Here, the internal input/output terminals 85 are exposed from the external wall surface 88a of the resin part 88 and are in contact with the internal connection terminals 60 in such a way to be electrically conductive. The external input/output terminals 86 are exposed from the external wall surface 88a of the resin part 88 and are in contact with the external connection terminals 76 in such a way to be electrically conductive. Furthermore, the heat radiating plate 87 has a flat surface 87a exposed from the external wall surface 88a of the resin part 88, and the flat surface 87a is in surface contact with internal wall surface 70b of the heat conducting part 70 in such a way as to be able to conduct heat.

The urging part 82 is a plate spring made of metal and is housed in the external exposed portion 66 along with the control circuit unit 80. The urging part 82 is interposed between the control circuit unit 80 and the mounting portion 74 and urges the control circuit unit 80 to the heat conducting part 70 by its restoring force. With this, the heat radiating plate 87 of the control circuit unit 80 is pressed onto the heat conducting part 70.

As shown in FIG. 1 and FIG. 3, the external cable 38 is made of a cable body 39 and a cable connector 40. The cable body 39 is a flexible cable made of metal signal wires 91 wrapped by a base material 90 formed of resin in the shape of a belt, as is the case with the internal cable 34. As shown in FIGS. 2A and 2B, one end of the cable body 39 is fixed to an engine control unit 92 provided outside the housing 12 and the signal wires 91 of the cable body 39 are electrically connected to the input/output terminals of the engine control unit 92. Here, the engine control unit 92 is an electronic control unit for controlling the engine and the like of a vehicle and controls the engine and the like on the basis of various kinds of sensor signals.

As shown in FIG. 1 and FIG. 3, the cable connector 40 is formed of resin and has a main portion 94 and arm portions 95 that are mounted in the state of engagement (that is, mounted by the use of engagement) on the mounting portion 74 and the heat radiating portion 26, respectively.

The main portion 94 is formed in the shape of a rectangular block fitted in the depressed portion 75 of the mounting portion 74. In the main portion 94 are embedded an end portion opposite to the engine control unit 92 of the cable body 39 and intermediate connection terminals 96 electrically connected to the end portion. Moreover, in the main portion 94 is formed a depressed portion 97 that is open on the opposite side of the cable body 39 and is externally fitted on the cylindrical portion 78 of the mounting portion 74. The intermediate connection terminals 96 protrude into this depressed portion 97 from the bottom thereof and are in contact with the external connection terminals 76 in the cylindrical portion 78 in such a way as to be electrically conductive.

The arm portions 95 are provided, one to one side, on both sides sandwiching the depressed portion 97 of the main portion 94 and are further extended to the external exposed portion 66 than the main portion 94. The respective arm portions 95 are extended nearly in parallel in such a way as to sandwich the external exposed portion 66 in the radial direction and are respectively engaged with both side surfaces 26b, 26c of the heat radiating portion 26 at their extending end portions. With this, the cable connector 40 is secured to the heat radiating portion 26, whereby the external exposed portion 66 is sandwiched between and fixed to the heat radiating portion 26 and the main portion 94. Here, the heat radiating portion 26 and the main portion 94 sandwich the external exposed portion 66 in a direction nearly orthogonal to the axis of the through hole 24. In the present embodiment, the respective arm portions 95 have claws 98 formed at their extending end portions and the respective claws 98 are engaged with the depressed portions 99 formed in the respective side surfaces 26b, 26c of the heat radiating portion 26 to thereby prevent the cable connector 40 from being removed from the heat radiating portion 26.

With the above construction, in the automatic transmission 10, a signal can be sent and received between the solenoid valves 42 and the pressure sensor 43 of the pressure control unit 32 and between the engine control unit 92 and the control circuit unit 80. In the automatic transmission 10 like this, the control circuit unit 80 receives a control signal and various kinds of sensor signals of the vehicle from the engine control unit 92 and a pressure sensor signal from the pressure sensor 43 and produces a command signal to the solenoid valve 42 on the basis of these received signals. The solenoid valve 42 receives the command signal produced in this manner from the control circuit unit 80 and operates so as to cause the pressure supplied to the moving elements 31 to follow the command signal. Therefore, in the present embodiment, the operation of the moving elements 31 and by extension the operation of the whole transmission mechanism 14 follow the command signal of the control circuit unit 80.

Next, the operation test process, the final assembly process, and the repair/replacement process of the automatic transmission 10 will be described.

In the operation test process, first, there are prepared the transmission case 18 that houses the transmission mechanism 14 but is not yet mounted with the oil pan 20, the pressure control unit 32 that houses the solenoid valves 42 and the pressure sensor 43 in the body 44, and the main connector 36 that houses the control circuit unit 80 in the connector body 50 closed by the external cap 54. Next, the pressure control unit 32 is combined with the transmission case 18 and the internal cable 34 connected to the pressure control unit 32 is mounted between the internal exposed portion 64 of the connector body 50 and the internal cap 52 to electrically connect the solenoid valves 42 and the pressure sensor 43 to the control circuit unit 80. Next, a cable connector of a test unit (not shown) is mounted on the mounting portion 74 of the external exposed portion 66 of the connector body 50 to electrically connect the test unit to the control circuit unit 80, and then a control signal is sent from the test unit to the control circuit unit 80 to thereby operate the solenoid valve 42. At this time, working oil is supplied to the pressure control unit 32 from an oil pump provided in the test unit and hydraulic pressure according to the operation of the solenoid valve 42 is supplied to the moving elements 31 of the transmission mechanism 14. The transmission mechanism 14 is driven by this supplied hydraulic pressure and hence speed change characteristics can be tested and adjusted by changing, as appropriate, the control signal sent from the test unit to the control circuit unit 80. As a result, when the speed change characteristics become desired speed change characteristics, the cable connector of the test unit is removed from the connector body 50 to finish the operation test process.

Figure 5:
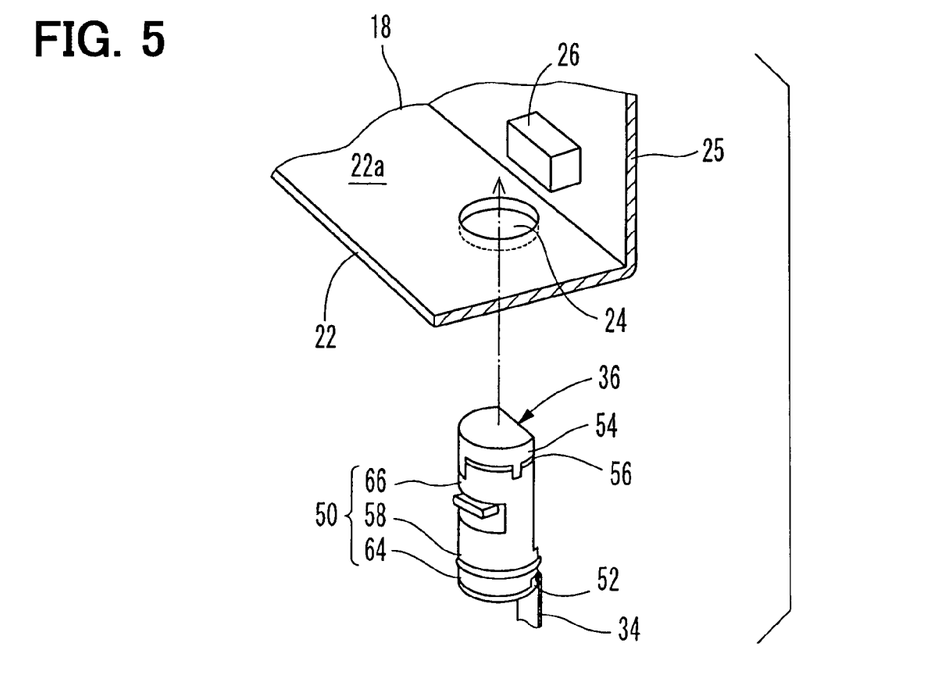
FIG. 5 is a schematic view for showing the final assembly process of the automatic transmission in accordance with the first embodiment.

After the above-described operation test process, the final assembly process is carried out. Specifically, first, as shown in FIG. 5, the main connector 36 is made to pass through the through hole 24 of the transmission case 18 from the external cap 54 side as the internal cable 34 is mounted between the connector body 50 and the internal cap 52. With this passing the main connector 36, the housing portion 58 of the connector body 50 is housed in the through hole 24, and then the oil pan 20 is combined with the transmission case 18 to thereby form the housing 12 that houses the pressure control unit 32, the internal cable 34, and the like. Thereafter, the cable connector 40 of the external cable 38 is mounted, by the use of engagement, on the external exposed portion 66 of the connector body 50 and the heat radiating portion 26 of the transmission case 18. At this time, as to the cable connector 40, by causing the external exposed portion 66 to enter between the respective arm portions 95, the main portion 94 is mounted on the mounting portion 74 of the external exposed portion 66 from the opposite side of the heat radiating portion 26 and at the same time the respective arm portions 95 are mounted on the heat radiating portion 26 from the external exposed portion 66 side. With this, the external exposed portion 66 is sandwiched between and fixed to the cable connector 40 and the heat radiating portion 26, and the heat conducting part 70 of the external exposed portion 66 is pressed onto the heat radiating portion 26. In this manner, the automatic transmission 10 is completed.

When a failure is found in the main connector 36 of the automatic transmission 10 in use in the market, a repair/replacement process is carried out. In this repair/replacement process, for example, in the case where it is found that the failure is caused by the control circuit unit 80, only the external cap 54 is removed without removing the external cable 38 and the oil pan 20. With this, the opening 67 of the external exposed portion 66 is opened and the control circuit unit 80 in the external exposed portion 66 is taken out through the opening 67 and a test of the control circuit unit 80 is carried out. As a result, when it is determined that the control circuit unit 80 can be repaired, the control circuit unit 80 is repaired and then is returned into the external exposed portion 66; on the other hand, when it is determined that the control circuit unit 80 cannot be repaired, a new control circuit unit 80, which is separately prepared, is inserted into the external exposed portion 66. In either of these two cases, after the above-described work, the external cap 54 is mounted on the external exposed portion 66 of the main connector 36 to close the opening 67. In this manner, the repair/replacement process of the control circuit unit 80 is completed.

On the other hand, when it is not determined whether or not the failure is caused by control circuit unit 80, first, the cable connector 40 of the external cable 38 is removed from the external exposed portion 66 of the main connector 36 and the heat radiating portion 26 of the transmission case 18. Next, the main connector 36 and a part of the internal cable 34 are taken out through the through hole 24 in a state where the oil pan 20 is held combined with the transmission case 18. Next, the internal cap 52 is separated from the internal exposed portion 64 and the internal cable 34 is removed from the main connector 36 and an inspection of the main connector 36 is carried out. As a result, when it is determined that the main connector can be repaired, the main connector 36 is repaired and then the internal cable 34 is mounted on the main connector 36; on the other hand, when it is determined that the main connector cannot be repaired, the internal cable 34 is mounted in a new main connector 36, which is separately prepared. In either of the two cases, after the above-described work, the internal exposed portion 64 and the internal cable 34 are returned into the housing 12 through the through hole 24 and then as is the case with the above-described final assembly process, the cable connector 40 is mounted on the external exposed portion 66 and the heat radiating portion 26. In this manner, the repair/replacement process of the main connector 36 is completed.

As described above, according to the first embodiment, the external exposed portion 66 of the main connector 36 is formed in such a way as to be able to pass through the through hole 24. With this, after the operation test process, the main connector 36 can be inserted into the through hole 24 as the internal cable 34 is mounted in the main connector 36, that is, as the control circuit unit 80 is electrically connected to the solenoid valves 42 and the pressure sensor 43. Moreover, when the main connector 36 is inserted into the through hole 24, by bending the flexible internal cable 34, while the solenoid valves 42 and the pressure sensor 43 are held electrically connected to the control circuit unit 80, the main connector 36 can be moved comparatively freely. Furthermore, after the insertion of the main connector 36, by combining the transmission case 18 with the oil pan 20 as the solenoid valve 42 and the pressure sensor 43 is held electrically connected to the control circuit unit 80, it is possible to form the housing 12 that houses the pressure control unit 32 and the internal cable 34. In this manner, after the operation test process, it is not necessary to clear the state where the solenoid valves 42 and the pressure sensor 43 are electrically connected to the control circuit unit 80, electric characteristics between the solenoid valves 42 and the pressure sensor 43 and the control circuit unit 80 can be held. Therefore, the completed automatic transmission 10 can exert desired speed change characteristics.

Moreover, according to the first embodiment, the internal exposed portion 64 and the internal cable 34 of the main connector 36 are so formed as to be able to pass through the through hole 24. With this, in the repair/replacement process, the main connector 36 and a part of the internal cable 34 can be taken out to the outside of the housing 12 as the oil pan 20 is combined with the transmission case 18. In addition, according to the first embodiment, internal and external cables 34, 38 are removably mounted on the main connector 36, so it is possible to repair the main connector 36 as a single body and to replace the main connector 36 with a new one.

Furthermore, according to the first embodiment, the control circuit unit 80 is housed in the connector body 50 whose opening 67 can be opened or closed by the external cap 54. With this, in the repair/replacement process, the control circuit unit 80 is taken out to the outside of the connector body 50 through the opening 67 and then the control circuit unit 80 can be repaired as a single unit and can be replaced with a new one. In addition, the internal and external input/output terminals 85, 86 of the control circuit unit 80 are put into contact with the internal and external connection terminals 60, 76 embedded in the connector body 50, thereby being electrically connected to the internal and external cables 34, 38. For this reason, the control circuit unit 80 can be taken out of the connector body 50 even as the internal and external cables 34, 38 are mounted in the connector body 50 and hence the work of taking out the control circuit unit 80 can be easily performed. Therefore, it is possible to shorten the time required to perform the repair/replacement process and hence to reduce the cost required to repair or replace the control circuit unit 80.

Furthermore, according to the first embodiment, the heat conducting part 70, which is in contact with the control circuit unit 80 in the connector body 50, is pressed onto the heat radiating portion 26 of the transmission case 18, so the heat generated in the control circuit unit 80 is conducted to the heat radiating portion 26 outside the connector body 50 and is dissipated. Here, the heat conducting part 70 is in surface contact with both of the control circuit unit 80 and the heat radiating portion 26, and hence heat conduction from the control circuit unit 80 to the heat conducting part 70 and further to the heat radiating portion 26 is accelerated. Moreover, the control circuit unit 80 is pressed onto the heat conducting part 70 by the restoring force of the urging part 82 and hence heat conduction from the control circuit unit 80 to the heat conducting part 70 is accelerated. In this manner, the heat of the control circuit unit 80 covered with the connector body 50 can be sufficiently released to the outside, and hence the malfunction and by extension the transmission error of the control circuit unit 80 can be prevented.

In addition, according to the first embodiment, the heat radiating portion 26 is protruded in a direction nearly orthogonal to the axis of the through hole 24 from the side wall portion 25 of the transmission case 18. Then, in the main connector 36, the projecting portion 72 projecting further to the side wall portion 25 than the abutting portion 68, which abuts against this heat radiating portion 26 outside the housing 12, is adjacent to the through hole 24 side of the abutting portion 68. In this construction, the heat radiating portion 26 and the projecting portion 72 are arranged in an overlapping manner in the axial direction of the through hole 24 and hence a heat conduction structure from the main connector 36 to the heat radiating portion 26 can be realized in a small space. In addition, the distance $d_2$ between the heat radiating portion 26 and the projecting portion 72 in the axial direction of the through hole 24 is longer than the distance $d_1$ between the bottom end surface 52a of the internal cap 52 and the external wall surface 22a of the flange portion 22, and hence the work of taking out the main connector 36 in the repair/replacement process is not interrupted.

According to the first embodiment, each of the transmission case 18 and the oil pan 20 corresponds to "a divided part," the main connector 36 corresponds to "a connector," the pair of external exposed portion 66 and external cap 54 of the connector body 50 correspond to "the external exposed portion of the connector," the pair of internal exposed portion 64 and internal cap 52 of the connector body 50 correspond to "the internal exposed portion of the connector," and the bottom end surface 52a of the internal cap 52 corresponds to "the end surface of the internal exposed portion." Moreover, the solenoid valves 42 and the pressure sensor 43 correspond to "the electric components of the pressure control unit," respectively, and the engine control unit 92 corresponds to "an electric component outside the housing." Furthermore, the connector body 50 corresponds to "a covering part," the external cap 54 corresponds to "a cap," the heat conducting part 70 corresponds to "a heat conducting part," the external input/output terminals 86 correspond to "the terminals of the control circuit unit," and the side wall portion 25 corresponds to "a base portion."

Second Embodiment

Figure 6:
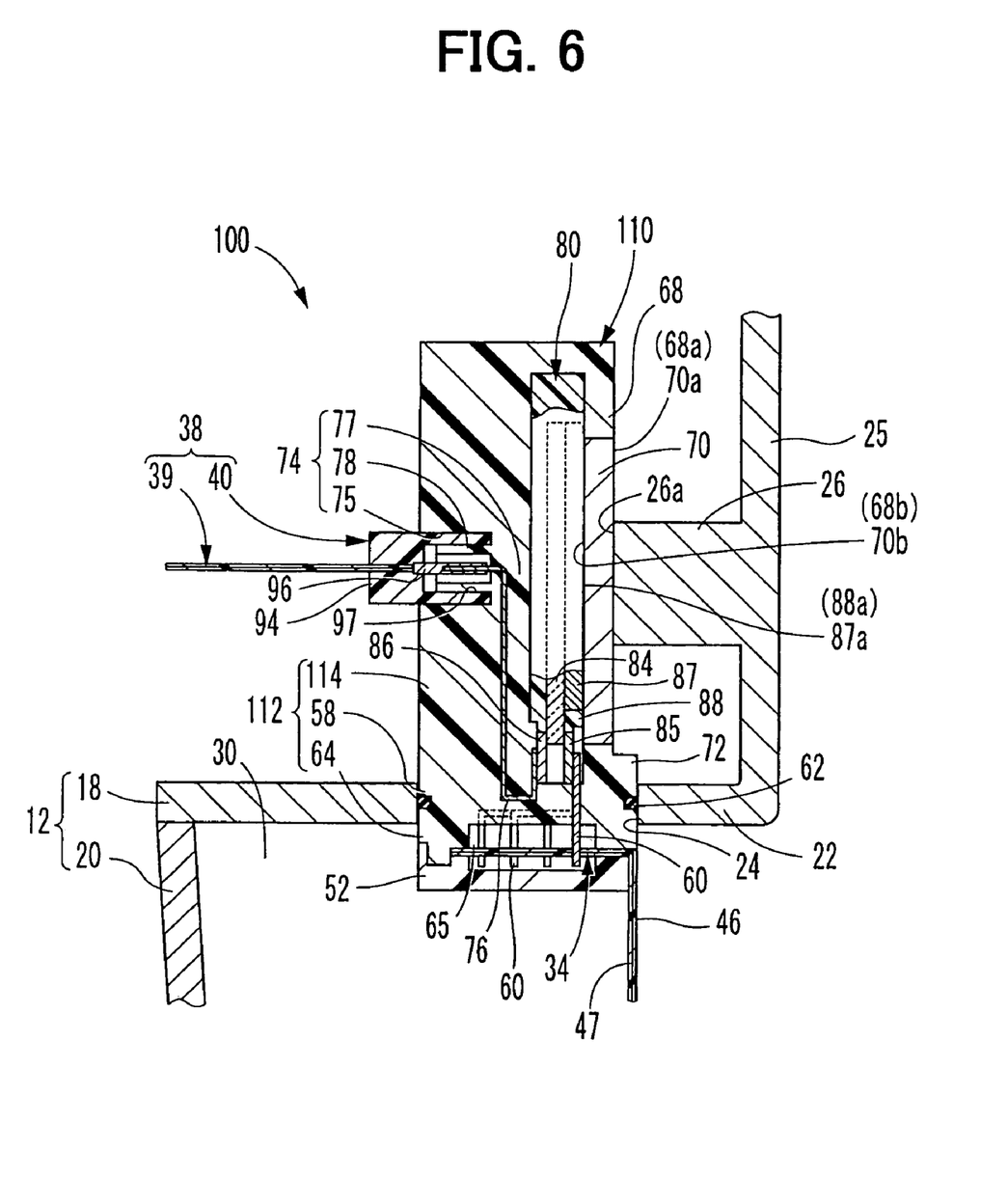
FIG. 6 is a sectional view showing the main portion of an automatic transmission in accordance with the second embodiment.

As shown in FIG. 6, the second embodiment of the present invention is a modification of the first embodiment and the substantially same constituent parts as those in the first embodiment will be denoted by the same reference symbols and their descriptions will be omitted.

In an automatic transmission 100 of the second embodiment, an external exposed portion 114 of a connector body 112 of a main connector 110 is formed in a nearly cylindrical shape. Then, in this external exposed portion 114 are embedded the heat conducting part 70, the terminals 60, 76, and the control circuit unit 80. According to the second embodiment like this, the main connector 110 in which the control circuit unit 80 is covered with the connector body 112 can be easily molded by insertion molding and hence cost can be reduced. Moreover, the external cap 54 and the gasket 56 in the first embodiment are not required to be provided, which results in also reducing cost. Furthermore, the heat radiating plate 87 of the control circuit unit 80 is always in close contact with the heat conducting part 70 without using the urging part 82 in the first embodiment, which results in also enhancing the effect of reducing cost and at the same time enhancing the effect of dissipating heat from the control circuit unit 80.

In the second embodiment, the main connector 110 corresponds to "a connector," the connector body 112 corresponds to "a covering part," and the pair of external exposed portion 114 and external cap 54 of the connector body 112 correspond to "the external exposed portion of the connector."

Third Embodiment

Figure 7:
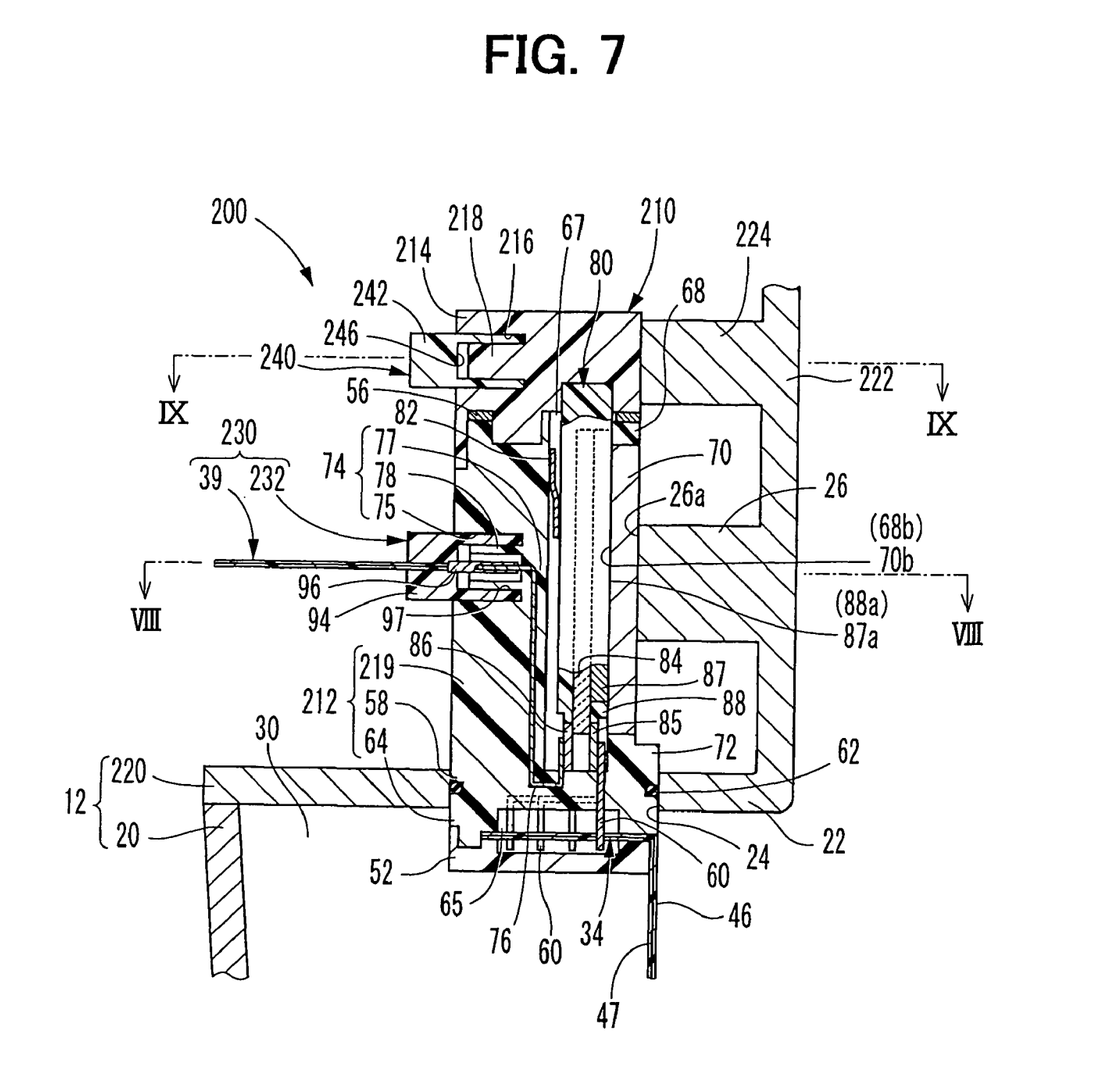
FIG. 7 is a sectional view showing the main portion of an automatic transmission in accordance with the third embodiment.
Figure 8:
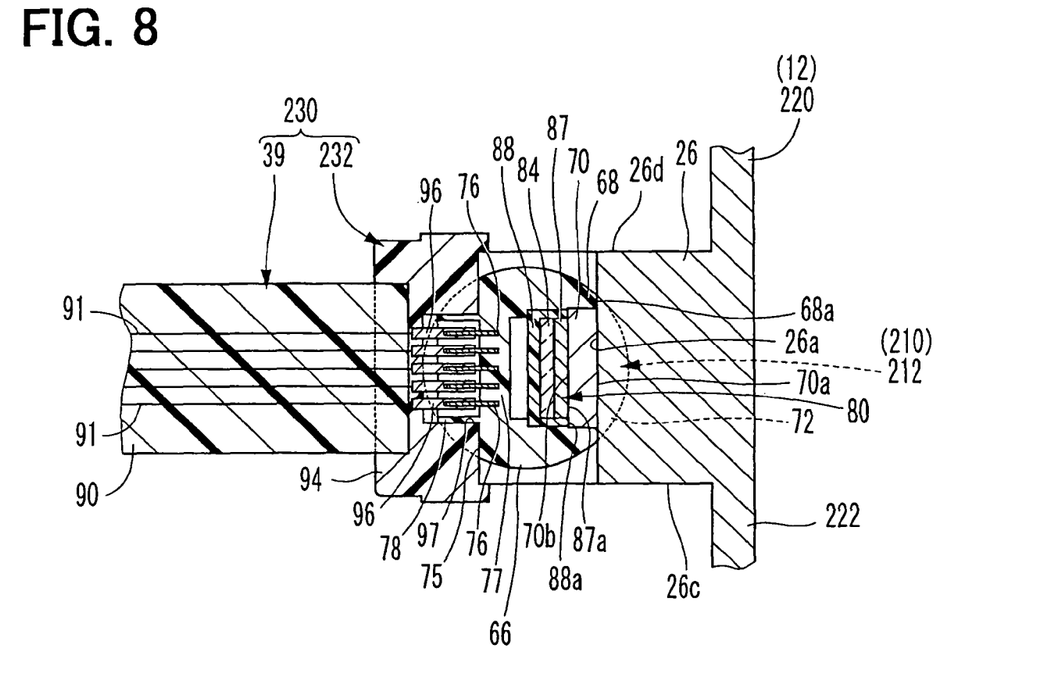
FIG. 8 is a sectional view taken on a line VIII-VIII in FIG. 7.
Figure 9:
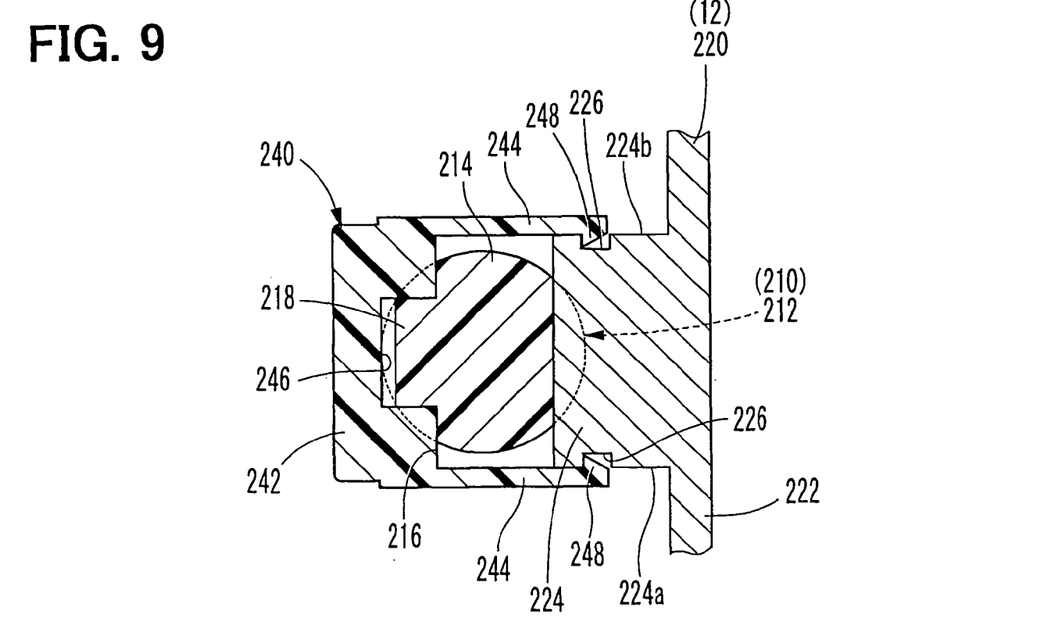
FIG. 9 is a sectional view taken on a line IX-IX in FIG. 7.

As shown in FIG. 7 to FIG. 9, the third embodiment of the present invention is a modification of the first embodiment and the substantially same constituent parts as those in the first embodiment will be denoted by the same reference symbols and their descriptions will be omitted.

In an automatic transmission 200 according to the third embodiment, a cable connector 232 of an external cable 230 is not provided with the respective arm portions 95 of the first embodiment, but the cable connector 232 is mounted on only a connector body 212 of a main connector 210. In the automatic transmission 200 like this, the main connector 210 is fixed by the use of a clip part 240.

Specifically, the clip part 240 is so constructed as to have a main portion 242 and arm portions 244, as is the case with the cable connector 40 of the first embodiment. However, the main portion 242 shaped like a rectangular block is fitted in a depressed portion 216 which is open to the outer peripheral surface of an external cap 214 of the main connector 210 and is depressed inward in the radial direction, and a depressed portion 246 of the main portion 242 is externally fitted on a protruding portion 218 protruding into the depressed portion 216 of the external cap 214. Moreover, claws 248 of the respective arm portions 244 are respectively engaged with depressed portions 226 formed on both side surfaces 224a, 224b of a fixing portion 224 formed on a side wall portion 222 of a transmission case 220. In this manner, the main connector 210 is fixed to the transmission case 220 in a state where the connector body 212 is sandwiched between the clip part 240 and the fixing portion 224.

In the final assembly process of the automatic transmission 200 like this, the main connector 210 is made to pass through the through hole 24 and the oil pan 20 is combined with the transmission case 220 in sequence, and then the cable connector 232 of the external cable 230 is mounted, by the use of latching, only on the external exposed portion 219 of the connector body 212. The clip part 240 is mounted, by the use of engagement, on the external cap 214 and the fixing portion 224 of the transmission case 220 to fix the main connector 210 to the transmission case 220. In this manner, the automatic transmission 200 is completed.

According to the third embodiment like this, the clip part 240 that fixes the main connector 210 to the transmission case 220 is a part separate from the cable connector 232 of the external cable 230. Therefore, it is possible to prevent the occurrence of problems such as a problem that the cable connector 232 is broken by strain caused when the main connector 210 is fixed to the transmission case 210.

According to the third embodiment, each of the transmission case 220 and the oil pan corresponds to "a divided part," respectively, and the main connector 210 corresponds to "a connector." Moreover, the pair of external exposed potion 219 and an external cap 216 of the connector body 212 correspond to "the external exposed portion of the connector," the connector body 212 corresponds to "a covering part," the external cap 214 corresponds to "a cap," and the side wall portion 222 corresponds to "a base portion."

Fourth Embodiment

Figure 10:
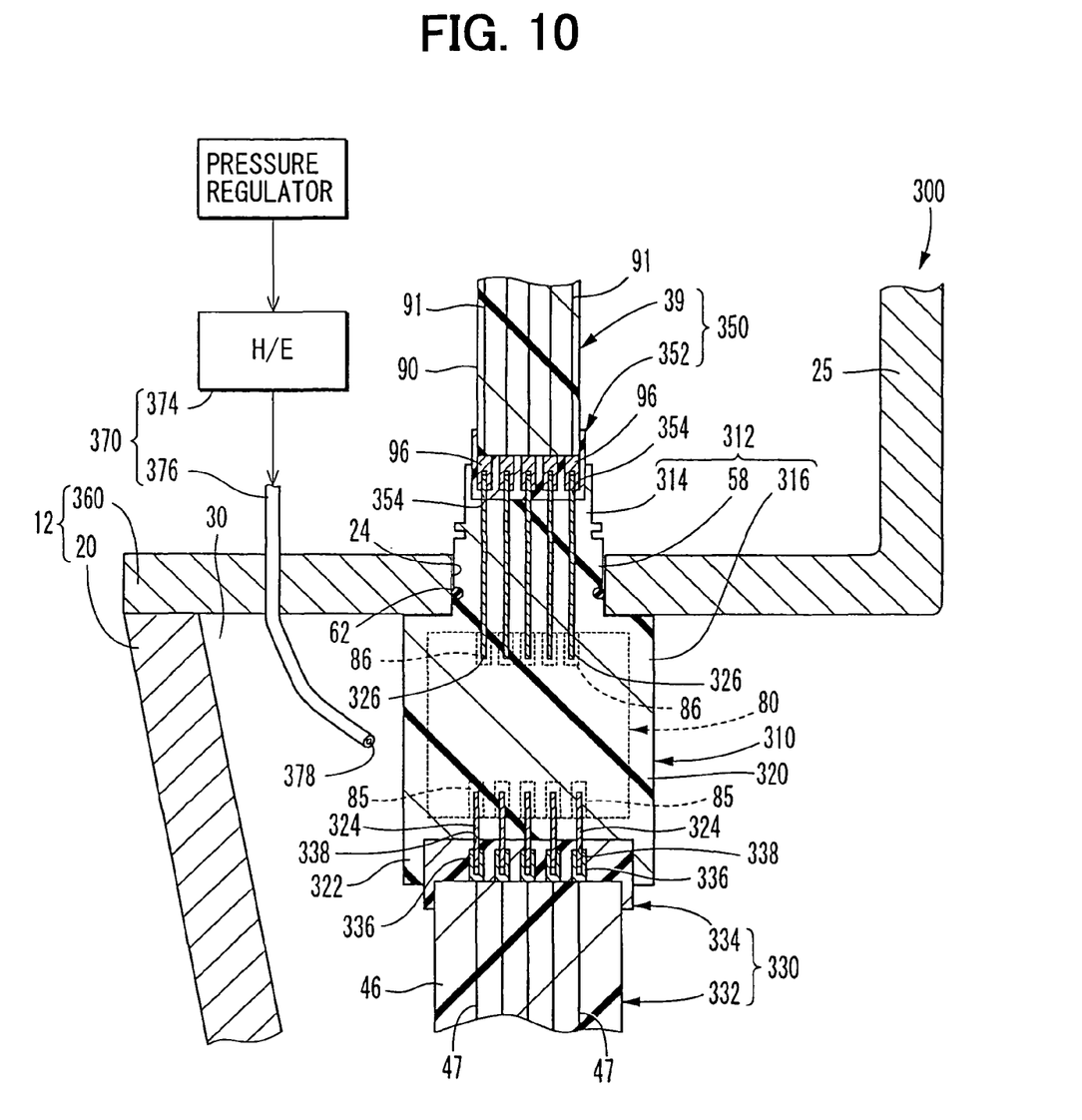
FIG. 10 is a schematic view for showing the main portion of an automatic transmission in accordance with the fourth embodiment.

As shown in FIG. 10, the fourth embodiment of the present invention is a modification of the first embodiment and the substantially same constituent parts as those in the first embodiment will be denoted by the same reference symbols and their descriptions will be omitted.

In an automatic transmission 300 according to the fourth embodiment, the control circuit unit 80 is not housed in an external exposed portion 314 of a connector body 312 of a main connector 310, but the control circuit unit 80 is embedded in an internal exposed portion 316 of the connector body 312 instead.

Specifically, the internal exposed portion 316 has a cylindrical embedding portion 320 in which the control circuit unit 80 is embedded and a mounting portion 322 on which an internal cable 330 is mounted and which is closed at one end. The embedding portion 320 is formed in a diameter larger than the inside diameter of the through hole 24 and hence cannot be made to pass through the through hole 24. Internal and external connection terminals 324, 326, which are respectively electrically connected to the internal and external input/output terminals 86, 86 of the control circuit unit 80, and the control circuit unit 80 are embedded together in this embedding portion 320. The mounting portion 322 is formed on the opposite side of the housing portion 58 of the embedding portion 320 with its opening faced downward. The internal connection terminals 324 are protruded into this mounting portion 322 from the bottom thereof. Here, the internal cable 330 of the automatic transmission 300 is formed of a cable body 332 having the same construction as the internal cable 34 of the first embodiment and a cable connector 334 fixed to the cable body 332. An end portion opposite to the pressure control unit 32 of the cable body 332 and intermediate connection terminals 336 electrically connected to the end portion are embedded in the cable connector 334, which is fitted in the mounting portion 322 and is formed in a cylindrical shape. Moreover, guide holes 338 in which the intermediate connection terminals 336 are respectively exposed from an internal wall surface are formed in the cable connector 334, and the internal connection terminals 324 fitted in the guide holes 338 are in contact with the intermediate connection terminals 336 in such a way as to be electrically conductive.

On the other hand, the external exposed portion 314 is formed in the shape of a cylinder whose opening faces upward and into which the external connection terminals 326 are protruded and which is closed at one end. The maximum diameter of the external exposed portion 314 is not larger than the inside diameter of the through hole 24 and hence the external exposed portion 314 can pass through the trough hole 24. In the automatic transmission 300, a cable connector 352 of an external cable 350 in which the intermediate connection terminals 96 are embedded is formed in the shape of a cylinder fitted in the external exposed portion 314. This cable connector 352 has guide holes 354 in which the intermediate connection terminals 96 are exposed from the internal wall surface and the external connection terminals 326 fitted in the guide holes 354 are in contact with the intermediate connection terminals 96 in such a way as to be conductive. In the present embodiment, a transmission case 360 is not provided with the heat radiating portion 26 of the first embodiment, and hence the cable connector 352 is mounted on only the connector body 312. Therefore, the main connector 310 is supported by the transmission case 360 only by the housing portion 58 being fitted in the through hole 24.

The automatic transmission 300 is provided with a cooling circulating unit 370 that cools and circulates working oil in the oil pan 20. This cooling circulating unit 370 has a heat exchanger 374 that cools the working oil sucked from the internal space 30 and discharged outside the housing 12 by the pressure control action of the pressure control unit 32 and a return pipe 376 that returns the working oil cooled by the heat exchanger 374 to the internal space 30. Here, an exit 378 of the return pipe 376 is located near the outer peripheral surface of the internal exposed portion 316 and the cooled working oil is sprayed to the internal exposed portion 316 from the exit 378.

In the operation test process of the automatic transmission 300 like this, before the solenoid valve 42 is activated, the cable connector 334 of the internal cable 330 is fitted in the internal exposed portion 316 of the connector body 312 in which the control circuit unit 80 is embedded by insertion molding. With this, the solenoid valve 42 and the pressure sensor 43 are electrically connected to the control circuit unit 80 and hence speed change characteristics can be tested and adjusted on the basis of the action of the solenoid valve 42.

Moreover, in the final assembly process of the automatic transmission 300 like this, the main connector 310 is made to pass through the through hole 24 and the oil pan 20 is combined with the transmission case 360 in sequence and then the cable connector 352 of the external cable 350 is fitted in the external exposed portion 314 of the connector body 312. Thereafter, the cooling circulating unit 370 is combined with them and then the exit 378 of the return pipe 376 is arranged near the outer peripheral surface of the internal exposed portion 316. In this manner, the automatic transmission 300 is completed.

According to the fourth embodiment like this, a comparatively large space to store oil can be secured as the internal space 30 in the housing 12 and hence the internal exposed portion 316 of the connector body 312 exposed to the internal space 30 can be formed in a large size. Therefore, the circuit board 84 and the heat radiating plate 87 of the control circuit unit 80 covered by the internal exposed portion 316 can be enlarged in area, and hence the heat radiation performance of the control circuit unit 80 can be enhanced. In addition, the working oil cooled by the action of the cooling circulating unit 370 is sprayed to the internal exposed portion 316 covering the control circuit unit 80. Therefore, it is possible to cool the internal exposed portion 316 and by extension the control circuit unit 80 and hence to enhance the effect of preventing the occurrence of transmission error.

Moreover, according to the fourth embodiment, the main connector 310 in which the control circuit unit 80 is covered with the connector body 312 can be easily molded by insertion molding, so it is possible to reduce cost. Furthermore, according to the fourth embodiment, the external cap 54 and the gasket 56 in the first embodiment are not required to be provided. This can reduce cost, too.

In this manner, in the fourth embodiment, each of the transmission case 360 and the oil pan 20 corresponds to "a divided part," and the main connector corresponds to "a connector." Moreover, the external exposed portion 314 of the connector body 312 corresponds to "the external exposed portion of the connector," the internal exposed portion 316 of the connector body 312 corresponds to "the internal exposed portion of the connector," and the connector body 312 corresponds to "a covering part."

In the first to fourth embodiments described above, the through hole 24 is formed in the transmission cases 18, 220, and 360. However, the through hole 24 may be formed in the oil pan 20. In this case, the heat radiating portion 26 is formed on the transmission cases 18, 220, 360, or the oil pan 20 according to the position of the through hole 24.

Moreover, in the first to fourth embodiments described above, the external wall surface 70a of the heat conducting part 70 and the protruding end surface 26a of the heat radiating portion 26 are formed in flat surfaces and are put into surface contact with each other. However, it is also recommended that these surfaces 70a, 26a be formed in curved surfaces that complement each other and be put into surface contact with each other.

Moreover, in the first to fourth embodiments described above, the control circuit unit 80 is electrically connected to the engine control unit 92 outside the housing 12 through the external cables 38, 230, and 350. In contrast to this, it is also recommended that the control circuit unit 80 be electrically connected to electric components that are arranged outside the housing 12 and are different from the engine control unit 92.

Furthermore, in the third embodiment, it is also recommended that the control circuit unit 80 be embedded in the external exposed portion 219 as is the case with the above-described second embodiment.

What is claimed is:

1. An automatic transmission comprising:
   a housing that is constructed of a plurality of divided parts and has a space, which is surrounded by these divided parts, formed therein, one of the divided parts defining a through hole;
   a pressure control unit that is housed in the housing and controls hydraulic pressure supplied to a transmission mechanism by an operation of an electric component;
   an internal cable that is housed in the housing and is electrically connected to the electric component of the pressure control unit;
   an external cable that is electrically connected to an electric component outside the housing; and
   a connector that is arranged in such a way as to pass through the through hole and has a control circuit unit electrically connected to the internal cable and the external cable,
   wherein the connector has a substantially cylindrical shape,
   wherein an entirety of the connector, including an external exposed portion of the connector exposed outside the housing and an internal exposed portion of the connector exposed inside the housing, is sized and formed in such a way, including having an outside diameter not larger than an inside diameter of the through hole, that the entire connector, including the entire external exposed portion and the entire internal exposed portion, is able to pass through the through hole between an interior and an exterior of the housing, from the interior to the exterior of the housing and from the exterior to the interior of the housing, and
   wherein the external cable is removably mounted on the external exposed portion so as to be electrically connected to the control circuit unit when mounted on the external exposed portion,
   whereby the connector can be assembled to the housing with the internal cable connected to the connector and an electrical connection between the control circuit unit and the electrical component of the pressure control unit maintained.

2. The automatic transmission according to claim 1, wherein the connector has a covering part that covers the control circuit unit.

3. The automatic transmission according to claim 2, wherein
   the housing has a heat radiating portion that radiates heat outside, and
   the connector has a heat conducting part embedded in the covering part and is put in contact with the control circuit unit and the heat radiating portion.

4. The automatic transmission according to claim 2, wherein
the covering part is formed in a hollow shape that has an opening in a portion constructing the external exposed portion and houses the control circuit unit.

5. The automatic transmission according to claim 4, wherein the connector has a cap that closes the opening.

6. The automatic transmission according to claim 5, wherein
any one of the covering part and the cap is fixed to the housing.

7. The automatic transmission according to claim 4, wherein
the connector has external connection terminals that are embedded in the covering part and are put in contact with terminals of the control circuit unit, and
the external cable is electrically connected to the control circuit unit through the external connection terminals.

8. The automatic transmission according to claim 7, wherein
the external cable is mounted on the housing and the external exposed portion in a state where the external cable and the housing sandwich the external exposed portion.

9. The automatic transmission according to claim 2, wherein
the control circuit unit is embedded in the covering part.

10. The automatic transmission according to claim 1, wherein
the internal cable is mounted on an internal exposed portion exposed inside the housing in the connector, and
the internal exposed portion and the internal cable are formed in such a way as to be able to pass through the through hole.

11. The automatic transmission according to claim 10, wherein
an outside diameter of the internal exposed portion is not larger than an inside diameter of the through hole.

12. The automatic transmission according to claim 10, wherein
the housing has a base portion provided on a periphery of the portion for defining a through hole and a heat radiating portion that protrudes from the base portion in a direction crossing an axis of the through hole and radiates heat outside,
the connector has an abutting portion that abuts against the heat radiating portion outside the housing and a projecting portion that is adjacent to the side of the portion for defining a through hole of the abutting portion and projects further to the base portion than the abutting portion, a distance between the heat radiating portion and the projecting portion being longer in an axial direction of the through hole than a distance between an end surface of the internal exposed portion and an external wall surface of the housing.

13. The automatic transmission according to claim 10, wherein
the internal cable is removably mounted on the internal exposed portion.

\* \* \* \* \*